Figure 4:
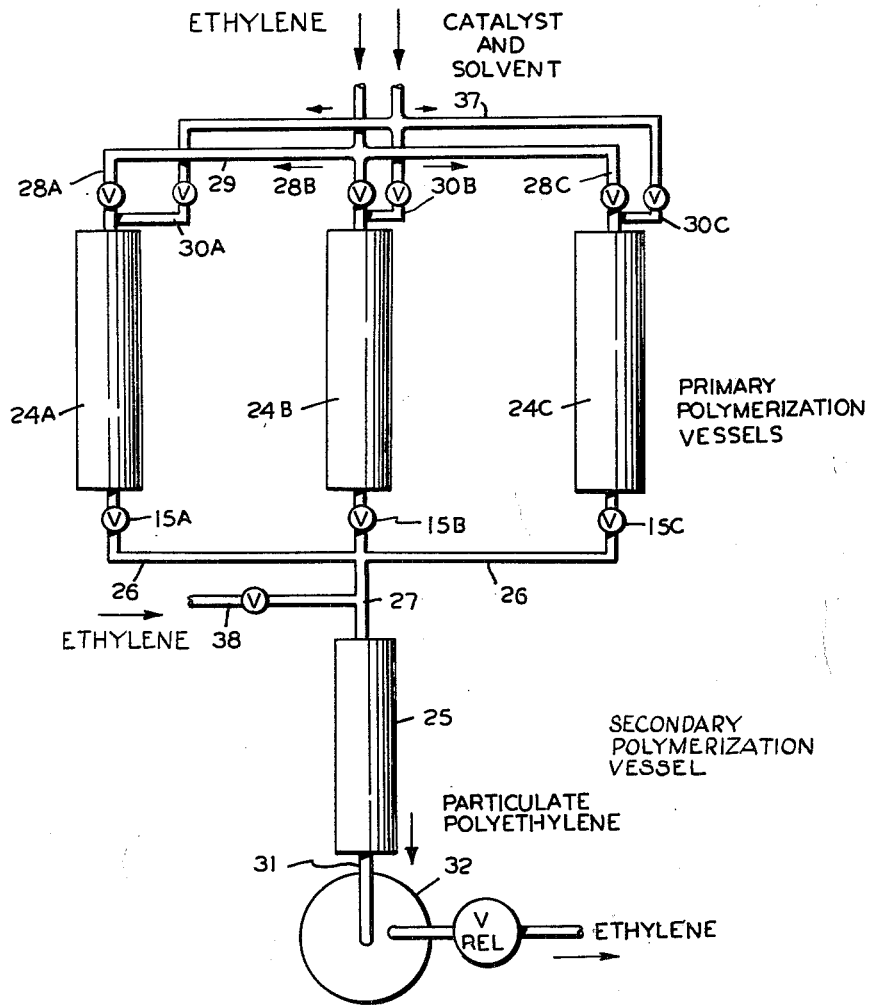

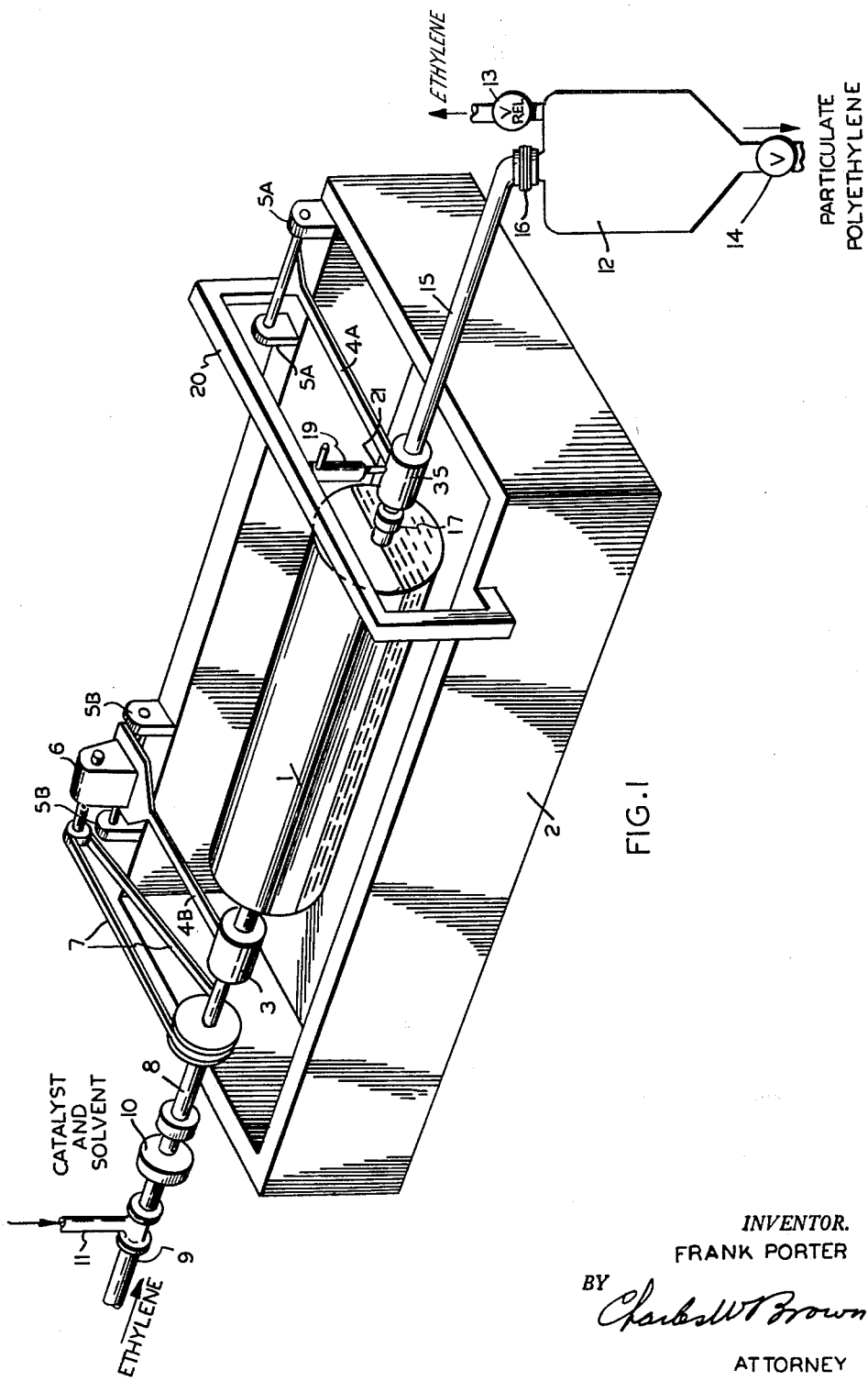

June 8, 1965    F. PORTER    3,188,306
PROCESSES AND APPARATUS FOR THE HANDLING OF POLYETHYLENE
Filed Feb. 28, 1961    3 Sheets-Sheet 2
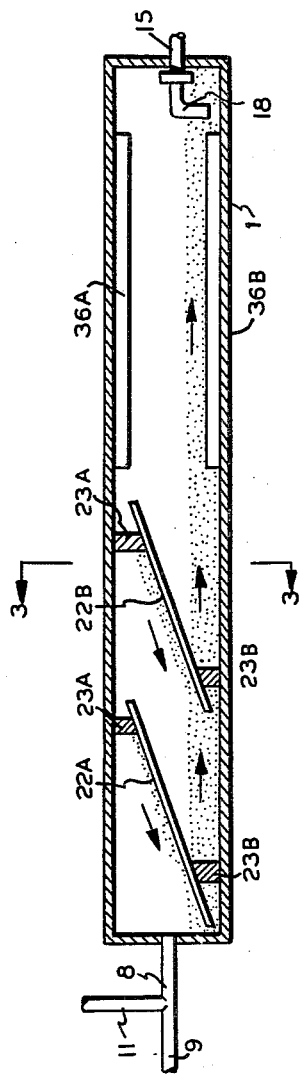
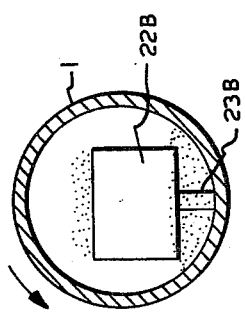
INVENTOR.
FRANK PORTER
BY Charles W. Brown
ATTORNEY

3,188,306
PROCESSES AND APPARATUS FOR THE HANDLING OF POLYETHYLENE

Frank Porter, Morris Township, Morris County, N.J., assignor to Allied Chemical Corporation, New York, N.Y., a corporation of New York
Filed Feb. 23, 1961, Ser. No. 96,341
3 Claims. (Cl. 260—94.9)

This invention relates to processes and apparatus for polymerizing ethylene to form a body of particulate, solid polyethylene in a confined reaction zone, under pressures above atmospheric, to which reaction zone ethylene, polymerization catalyst and a liquid solvent for ethylene is supplied, in which zone polymerization of the ethylene promoted by the presence of the catalyst takes place on the surfaces of particles of solid polyethylene wetted with the solevnt, and from which the polyethylene produced is withdrawn by dense phase flow of the particulate polyethylene through a passageway leading from that reaction zone. My invention particularly relates to continuously operable processes and apparatus for the production of polyethylene.

Heretofore various procedures have been proposed for the continuous, catalyzed polymerization of ethylene under elevated pressures. One such procedure has involved polymerizing the ethylene in the presence of sufficient liquid solvent for the ethylene to form a fluid suspension of the particles of polyethylene and catalyst in the solvent which can be continuously withdrawn from the polymerization vessel. A second procedure which has been proposed is to carry out the polymerization of the ethylene at temperatures at which the polyethylene formed, with or without the presence of limited amounts of solvent for ethylene, forms a fluid melt carrying the catalyst, which melt can be continuously withdrawn from the polymerization vessel.

In the known procedures in which ethylene is contacted with a particulate solid catalyst below the polyethylene softening point, e.g., temperatures of about 20°-100° C., the amount of solvent for the ethylene must be limited to permit the necessary contact of the ethylene gas with the solid particles of catalyst. Those processes have heretofore been carried out batchwise. The catalyst and solvent have been introduced into the reaction vessel and the ethylene introduced until the volume of particulate polyethylene in the reactor reached the capacity of the reactor for adequate contact of the polyethylene gas and catalyst in and on the particles of polyethylene. At this point the polymerization procedure was interrupted, the reaction vessel opened and the polyethylene product removed by suitable mechanical means.

It is an object of my invention to provide a continuously operated procedure for the production of particulate polyethylene at temperatures below that at which the polyethylene melts or softens to the point at which the particles of polyethylene fuse together in a coherent mass. Further objects of my invention are to provide a process for polymerizing ethylene obviating the difficulties and disadvantages heretofore encountered in known processes. Employing the procedures of my invention it is not necessary to introduce into the reactor sufficient liquid to form a fluid suspension of the polyethylene particles with the attendant need of recovering those large amounts of solvent from the fluid slurry withdrawn from the reactor. Nor does it require the expensive equipment needed when the polyethylene product is removed as a melt fed directly to extruding equipment. It permits lower operating temperatures for the production of the polyethylene. As compared with the known batch procedures, the processes of my invention do not require intermittently shutting down operation of the reactor, reducing the ethylene pressures in the reactor, flushing out the residual ethylene gas, and providing the equipment for removing the polyethylene. Nor does it require flushing the reactor free of air and moisture with an inert gas such as nitrogen before again starting up the procedure for the production of a new batch of polyethylene.

Two types of preferred apparatus for carrying out the continuous polymerization procedures of my invention are illustrated in the accompanying drawings. FIGURE 1 is a view of a single rotary drum polymerization vessel, with a tank in which it floats in a body of cooling water to remove heat of reaction liberated by the polymerization of the ethylene and to maintain the contents at a desired temperature, and appurtenant means for its operation. FIG. 2 is a cross section of the rotary drum polymerization vessel 1 of FIG. 1, and FIG. 3 is a cross section along line 3—3 of FIG. 2, showing the preferred flights in the inlet and outlet portions of the polymerization vessel to provide the desired showering of its content of solid polyethylene through ethylene gas, recycle of polyethylene in the inlet portion of the vessel and its advancement to the exit end of the vessel from which it is transferred by dense phase flow to a product receiving vessel. FIG. 4 is a view, looking downwardly, of a battery of rotary drum polymerization vessels containing flights of the same type as those in the left hand portion of drum 1 of FIGS. 1, 2 and 3, from which the solid polyethylene formed therein is continuously transferred to a single rotary drum containing the flights in the right hand portion of drum 1 of FIGS. 1, 2 and 3.

With reference to FIGS. 1, 2 and 3, a rotary drum polymerization vessel or reactor 1 revolves in a water bath 2 on a hollow shaft 8 held in bearing 3 and on the end of a pipe 15 held in support 35. Both this bearing and support are swiveled on radial arms 4A and 4B which pivot on the fixed bearings 5A and 5B, allowing the drum to float in the water bath. The drum is revolved by motor 6 and belt 7. Shaft 8 is connected to a pipe 9 by a stuffing box 10 for introducing ethylene gas into the reactor. A branch pipe 11, for introduction of catalyst and solvent for ethylene, leads from pipe 9. A receiving vessel 12, for polyethylene drawn from the reactor, is provided with a pressure relief valve 13 by which the gas pressure in the top of receiver 12 can be regulated and maintained at desired values, and with a valve 14 through which the polyethylene can be withdrawn. Receiver 12 is connected with one end of pipe 15 through a bellows connection 16. The other end of pipe 15 passes through a stuffing box 17 into the end of vessel 1, where it is connected with a dip pipe 18 as shown in FIG. 2.

An hydraulic cylinder 19 supported on a frame-work 20 with its piston rod 21 acting on the top of support 35 and a corresponding hydraulic cylinder, frame-work and piston rod, acting on the top of bearing 3, not shown in the drawing, serve to adjust and maintain at proper levels the two ends of the reactor, with the end in which the dip tube is positioned lower than the other end to induce the polyethylene formed in the reactor to pass towards the dip tube for withdrawal to receiver 12. Pipes 9 and 11, like receiver 12, are also provided with means, not shown in the drawing, permitting the alignment of pipe 9 with shaft 8 as changes in level of the reactor in the water bath are made.

As shown in FIGS. 2 and 3, the left hand portion of reactor 1 contains one or more flights 22A and 22B inclined downwardly towards the inlet end of the reactor, each supported by two brackets 23A and 23B. As shown in FIG. 3, flights 22A and 22B extend only across the central portion of the interior of the reactor. As the reactor turns in the direction shown by the arrow in FIG. 3, these flights pick up particulate polyethylene formed in this portion of the reactor and return it towards the left hand inlet end of the reactor as it is showered through the ethylene gas in the reactor. At the same time these flights permit particulate polyethylene to pass towards the right hand outlet end of the reactor. The right hand portion of the reactor, as shown in FIG. 2, contains flights 36A and 36B parallel to the central axis of the reactor. As the reactor turns, these flights pick up and shower the particulate polyethylene in this portion of the reactor through the ethylene gas and permit it to advance to the outlet end of the reactor, where it forms a body of particulate polyethylene into which dip pipe 18 penetrates. This particulate polyethylene product is withdrawn by dense phase flow through this dip pipe and its associated conduit 15. These flows of the polyethylene in the reactor are indicated by the arrows in FIG. 2.

With reference to FIG. 4, this illustrates an embodiment of the apparatus of my invention by which a high rate of production of polyethylene can be obained at a low expense for the equipment required.

As shown in FIG. 4, the apparatus comprises a battery of three primary polymerization vessels 24A, 24B and 24C, to each of which ethylene, catalyst and a solvent for polyethylene are supplied and from which an intermediate particulate polyethylene product is withdrawn and is passed into a single, secondary polymerization vessel 25, from which the final particulate polyethylene product is withdrawn.

Each of the primary polymerization vessels is a rotary drum reactor turning in a water bath containing one or more flights of the same type as shown in the left hand portion of the reactor of FIGS. 1, 2 and 3 and described above. Secondary polymerization vessel 25 is a rotary drum reactor turning in a water bath containing flights of the same type as shown in the right hand portion of the reactor of FIGS. 1, 2 and 3 and described above. Each of these rotary drum reactors shown in FIG. 4 is associated with the appurtenances described above for the rotary drum reactor shown in FIG. 1 with the following changes. Pipes 15A, 15B and 15C, each corresponding to pipe 15 of FIG. 1, and associated dip tube in each primary reactor, communicate with a manifold pipe 26, which in turn communicates through pipe 27, with secondary polymerization vessel 25. A pipe 38 permits introducing ethylene gas into pipe 27 and thence into vessel 25, as required for polymerization to polyethylene and to maintain the desired ethylene gas pressure, in addition to the ethylene accompanying the polyethylene from the primary polymerization vessels. Distributing pipes 28A, 28B and 28C, each corresponding to pipe 9 of FIGS. 1 and 2, serve to supply ethylene from a manifold pipe 29 to the primary reactors. Distributing pipes 30A, 30B and 30C, each corresponding to pipe 11 of FIGS. 1 and 2, serve to supply catalyst and solvent from manifold 37 to each of those reactors. Outlet pipe 31 and its associated dip pipe, corresponding to pipe 15 and dip pipe 18 of FIGS. 1 and 2, serve for passing polyethylene from the secondary polymerization vessel 25 to receiver 32. Receiver 32 and its appurtenances are the same as receiver 12 and its appurtenances shown in FIG. 1 and described above.

As illustrated by the apparatus of FIGS. 1–4 and described herein, the novel apparatus of my invention for continuously polymerizing ethylene to form a particulate polyethylene product comprises one or more elongated, rotary drum polymerization vessels rotated in contact with a cooling medium which removes heat liberated by polymerization of the ethylene. Each vessel is provided with an inlet at one end for introduction of ethylene gas, a particulate, solid catalyst and a liquid solvent for ethylene gas, and contains a bed of particulate, solid polyethylene containing the catalyst and wetted with the solvent for ethylene. The ethylene inlet end of the vessel is higher than the opposite end of the vessel. Means are provided within each vessel for repeatedly showering particulate polyethylene from the bed of polyethylene therein through the ethylene gas under elevated pressure above atmospheric and for permitting the bed of particulate polyethylene to progressively advance from the higher inlet end towards the lower outlet end of the vessel and accumulate in the outlet end as a body of dense phase, particulate polyethylene. A dip pipe with one end within this body of particulate polyethylene communicates with a conduit leading out of the vessel for removal of polyethylene therefrom to, for example, a second polymerization vessel or a receiver. Means are provided for maintainiig differential gas pressures on the body of dense phase polyethylene in the polymerization vessel and at the outlet end of the conduit under which the dense phase, particulate polyethylene flows through the dip pipe and conduit from within that body of polyethylene at about the same rate as the polyethylene collects therein.

In preferred forms of my apparatus the means for showering the particulate polyethylene through the ethylene gas in the inlet portion of a single polymerization vessel, or in the first of two polymerization vessels operating in series, also recycles polyethylene towards the inlet end of the vessel, while permitting polyethylene in the bed to pass to the outlet end of the vessel as it is showered through the ethylene, and to be withdrawn from the outlet end of the vessel through a dip pipe and conduit leading to a receiving vessel or to a second polymerization vessel in which the particulate polyethylene wet with the solvent for ethylene and carrying with it the particulate catalyst, is further showered through ethylene gas for further formation of particulate polyethylene.

In the processes of my invention ethylene gas under pressure above atmospheric is polymerized in the presence of a solid, particulate catalyst promoting its polymerization and a liquid solvent for the ethylene in one or more reaction zones to form particulate, solid polyethylene wetted with the solvent. This polyethylene is accumulated as a body of dense phase, particulate, solid polyethylene under elevated pressure and is removed through a passageway to a zone maintained under a lower gas pressure than that on the body of polyethylene, by dense phase flow of the polyethylene induced by the differential pressures in said zones.

In the more specific, preferred embodiments of the processes of my invention, ethylene gas under elevated pressure above atmospheric is continuously introduced into a first or primary reaction zone in which it is polymerized in contact with a bed of particulate, solid polyethylene containing a particulate, solid catalyst promoting polymerization of the polyethylene and wetted with a liquid solvent for the ethylene gas. This bed of particulate polyethylene progressively flows through the first reaction zone in which the polyethylene is repeatedly showered through the ethylene gas with return of particulate polyethylene from advanced points to less advanced points in the bed flowing through the reaction zone. The bed of particulate polyethylene flows from the first reaction zone into a second or secondary reaction zone in which the polyethylene is showered through ethylene gas under pressure above atmospheric for further polymerization. The bed of particulate polyethylene flows towards the end of this secondary reaction zone where it accumulates as a body of dense phase, particulate polyethylene and is removed as it accumulates in that body by dense phase flow of the particulate polyethylene through a passageway leading to a region of lower pressure than that of the ethylene gas in the secondary reaction zone.

The two reaction zones in which my continuous processes for polymerizing polyethylene are carried out may be in a single reactor or in separate reactors. The polyethylene formed in a plurality of the first or primary reaction zones in separate reactors and accumulated in the outlet ends of these zones, can be transferred by dense phase flow to a single second or secondary reaction zone in a reactor through which a bed of the polyethylene accompanied by the catalyst and solvent flows while being showered through ethylene gas under pressure above atmospheric but below that in the primary reaction zone. As the polyethylene accumulates in a dense phase body of the particulate solid polyethylene accompanied by catalyst and solvent in the end of the secondary reaction zone, it is removed therefrom by dense phase flow through a passageway leading out of this zone.

The following examples describe preferred specific embodiments of my invention and further preferred details of my processes and apparatus for producing polyethylene.

*Example 1.*—This example employs the apparatus illustrated in FIGS. 1, 2 and 3. The reactor is a cylindrical vessel about 50 feet long and 6 feet in diameter, having an internal volume of about 1400 cubic feet. The portion of the reactor adjacent the ethylene inlet contains two flights 23A and 23B, each about 12 feet long and 4 feet wide, inclined towards the ethylene inlet end of the reactor at an angle of about 16° from the longitudinal axis of the vessel. The other portion of the reactor, adjacent the polyethylene outlet, is provided with two flights about 12 inches wide, at right angles to the wall of the vessel and extending parallel to its axis about 22 feet from a point about 1 foot from the end of dip tube 18.

The ethylene gas used is one that has been purified to meet the following specifications.

Purity—at least 99.7% by weight.
Dewpoint—below −60° C. as measured by cooling a mirror surface with a Dry Ice-isopropanol mixture and observing the temperature of the mirror at which frost forms thereon when an ethylene gas stream is directed against the mirror.
Oxygen content—below 20 parts per million by weight, suitably measured by a standard potentiometric method.
Acetylene content—below 150 parts per million by weight.
Carbon dioxide content—below 100 parts per million by weight.
Carbon monoxide content—below 100 parts per million by weight.

The sum total of noxious impurities in the ethylene can generally be measured by a standard colorimetric method, e.g., by reaction with sodium benzophenone, and suitably is no more than 200 parts per million by weight calculated as oxygen.

The catalyst employed is a finely divided 90 silica/10 alumina, porous, synthetic, plural gel catalyst carrier impregnated with 2% by weight of magnesium dichromate and activated by heating at high temperatures, suspended in a solution of 5 lbs. of commercial aluminum triisobutyl analyzing 60% minimum aluminum triisobutyl and 40% maximum diisobutyl hydride, in 250 lbs. of dry pentane. The usual precautions to maintain the aluminum triisobutyl and its solution in pentane containing the activated catalyst under a non-oxidizing gas, e.g., nitrogen or ethylene, before its use are observed.

With valves 13 and 14 closed, the reaction vessel is conditioned by first evacuating it through pipe 9 to a very low pressure, introducing a pure, dry oxygen free nitrogen under about 15 p.s.i.g. pressure and again evacuating the vessel. It is then filled with the ethylene gas under 15 p.s.i.g. pressure and the ethylene is passed through the vessel until that leaving the vessel has a dew point of −60° C. and its oxygen content is below 20 p.p.m. The reactor is then closed off under about 1.5 p.s.i.g. pressure of ethylene.

About 55 gallons of the above pentane solution of aluminum triisobutyl is pumped into the reactor and it is heated at 45° C. to vaporize the pentane, followed by cooling to 30° C. to reflux the pentane. This cycle is continued for 24 hours, and the pentane solution of aluminum triisobutyl is drained from the reactor. The reactor is again evacuated, filled with oxygen free nitrogen under 15 p.s.i.g. pressure and again evacuated. Finally the reactor is purged by connecting it with a drum containing dry pentane from which 55 gallons of the pentane is introduced into the reactor. The reactor is heated to 45° C. to vaporize pentane and the pentane drum cooled to condense the vaporized pentane in the drum.

A solution of 5 lbs. of aluminum triisobutyl in 250 lbs. of dry pentane, in which 25 lbs. of the activated, supported chromium catalyst are suspended, is introduced into the reactor. The reactor is set in rotation and a flow of ethylene gas into the reactor is started at a controlled rate such that the temperature in the reactor increases about 10° C. per hour to 50°–55° C. and until the pressure of the ethylene gas in the reactor is built up to 150 p.s.i.g. and thereafter is held at about that pressure by the introduction of ethylene gas from pipe 9.

When about 11,000 lbs. of ethylene have been fed into the reactor, the reactor contains a bed of particulate polyethylene wetted by the pentane and containing the particulate solid catalyt and dense phase body of that particulate polyethylene, catalyst and solvent in the end of the reactor into which the dip tube penetrates. Steady state, continuous operation for production of polyethylene in accordance with my invention is initiated by bleeding ethylene gas from receiver 12 to create a pressure differential between the interior of the reactor and the receiver under which polyethylene passes from the polymerization vessel by dense phase flow through dip tube 18 and pipe 15 into receiver 12 at the same rate as additional particulate polyethylene continues to be formed in the reactor and accumulates in the outlet end of the reactor. This rate of withdrawal of the polyethylene can be determined by setting receiver 12 on a scale and by measuring the ethylene gas supplied to the reactor, that bled through pipe 13 and that accompanying the polyethylene removed from receiver 12. The weight of polyethylene withdrawn over a given period of time is about the same as the difference between the weight of the ethylene introduced and the weight of ethylene gas bleed plus that accompanying the polyethylene from receiver 12 during steady state, continuous operation of the reactor.

Since the catalyst and aluminum triisobutyl solution in pentane in the reactor are gradually depleted by the amounts of these materials accompanying the withdrawn polyethylene, the required additional amounts of these materials are continuously or periodically introduced with the ethylene supplied to the reactor in order to maintain the desired rate of polymerization of the ethylene. In the process of this example this requires the introduction of about 10 lbs. of dry pentane, 0.1 lb. of aluminum triisobutyl and 0.5 lb. of activated, supported chromium catalyst for every 1000 lbs. of polyethylene product withdrawn from the reactor. The slurry of catalyst in aluminum triisobutyl solution in pentane need not be continuously supplied to the reactor. It can be supplied in substantially uniform portions at ½ or 1 hour intervals, for example, without unduly affecting the rate of polymerization or the nature of the polyethylene product produced.

A pressure differential between the gas in the reaction vessel and that maintained by venting ethylene from the receiver of about 20 p.s.i.g., is adequate to induce dense phase flow of the body of particulate polyethylene from the reactor into the receiver. In the receiver the solid polyethylene settles out and is drawn, continuously or intermittently, from the receiver by dense phase flow past valve 14 for desired further treatment at pressures below the gas pressure in the receiver. The withdrawal of polyethylene from the receiver can be controlled by the pressure differential between the receiver and the point of discharge of the polyethylene, by the gate valve, or by a combination of both.

In a rotating drum reactor such as that employed in the reactor of Example 1, the agitation of the body of particulate polyethylene in the exit end of the reactor into which a dip tube penetrates will result in a larger proportion of ethylene gas in the interstices between the polymer particles than in the settled body of particulate polyethylene in the receiver and withdrawn therefrom. For example, the weight of ethylene gas accompanying the polyethylene flowing from the rotating reactor into the receiver can amount to about 10% of the polyethylene. On the other hand, the ethylene in the settled body of polyethylene in the receiver and accompanying the polyethylene withdrawn therefrom can amount to only about 6% by weight of the polyethylene. In both cases the transfer of the body of particulate polyethylene is by dense phase flow of the solid. In both cases the polyethylene is accompanied by a relatively small amount of gas as compared with the 5 to 15 times as much gas required by conventional pneumatic conveyors for the flow of aerated particulate solids through conduits in which they are transferred from one point to another.

Illustrative of the importance of this feature of my invention, in commercial operation of batch processes for polymerizing ethylene in a rotary drum polymerization vessel, in which the polyethylene is removed from the polymerization vessel employing air in conventional pneumatic means, the ethylene subsequently required for flushing the polymerization vessel preliminary to another run to produce polyethylene, is several times greater than the ethylene gas bled from the receiver plus that recovered from the settled product drawn from the receiver in the above example. Furthermore, the ethylene gas used for flushing the reactor must be purified before it can be used for the production of polyethylene, whereas the ethylene gas separated from the polyethylene in the processes of my invention needs no purification before being pumped back into the reaction vessel where it is converted to polyethylene.

These advantages in either a batch or continuous process follow from my discovery that a body of particulate polyethylene, wetted with a solvent for ethylene and containing a catalyst promoting the polymerization of ethylene and growth in molecular weight of the polyethylene can be passed by dense phase flow through even a small pipe without plugging the pipe. For example, a polyethylene as it came out of a rotary drum reactor, was passed from a tank through a ⅜ inch valve and 12 feet of ⅜ inch IPS pipe containing two 180° bends. Under an initial pressure differential of 30 p.s.i. dropping to about 11–14 p.s.i. final pressure differential between the tank and the outlet end of the pipe, the polyethylene passed through the pipe at an average flow rate of about 1000 lbs. per hour. The accompanying gas amounted to about 6% by weight of the polyethylene.

*Example 2.*—The process of this example is carried out in the apparatus illustrated in accompanying FIG. 4 and described above. Each of the three primary polymerization vessels is a rotary drum reactor 25 feet long and 6 feet in diameter containing two flights of the same construction and size and set at the same angle from the horizontal axis of the reactor as flights 22A and 22B of the apparatus used in Example 1. The secondary polymerization vessel is a rotary drum reactor 25 feet long and 6 feet in diameter containing two flights of the same construction and width as flights 36A and 36B of the apparatus used in Example 1 and extending from the ethylene inlet end of the reactor to about 1 foot from the end of the dip pipe at the polyethylene outlet end of the reactor.

After the apparatus, including the secondary polymerization vessel, has been conditioned in the manner described above in Example 1, and with valves 15A, 15B and 15C closed, a solution of 2.5 lbs. of aluminum triisobutyl in 125 lbs. of dry pentane containing 8 lbs. of the activated, supported catalyst employed in Example 1 are introduced into each of the three primary polymerization vessels. They are then set in rotation and a flow of ethylene gas into each of these vessels is started. The introduction of the ethylene gas is controlled so that the temperature in each reactor is increased to 50°–55° C. at the rate of about 10° C. per hour and until the pressure of the ethylene gas in these reactors is built up to 150 p.s.i.g. pressure.

When about 6000 lbs. of ethylene have been introduced into each of these primary polymerization vessels, the valves in pipes 15A, 15B and 15C are opened to allow solid, particulate polyethylene material wetted with the pentane solution of aluminum triisobutyl and carrying catalyst, to pass from each of these vessels with its accompanying ethylene by dense phase flow through these pipes, manifold 26 and pipe 27 into the secondary polymerization vessel at about the same rate as polyethylene is formed and accumulated in the body of polyethylene into which the dip tube in each of the primary vessels penetrates.

In the meantime, the secondary polymerization vessel has been set in rotation in its water cooling bath. The pressure of ethylene gas in this vessel and receiver 32 is built up to 50 p.s.i.g. by the ethylene accompanying the polyethylene introduced from the primary polymerization vessels, supplemented by the introduction of ethylene gas from pipe 38 as needed. The temperature in this vessel is maintained at about 55° C.

When about 6000 lbs. of polyethylene have accumulated in the secondary polymerization vessel, steady state, continuous operation is initiated and maintained by bleeding ethylene gas from receiver 32 to establish a differential pressure between vessel 25 and receiver 32 under which particulate polyethylene product accumulated in the secondary polymerization vessel passes by dense phase flow through pipe 31 and its dip pipe into receiver 32 where the polyethylene settles out from the accompanying ethylene gas. This removal of the polyethylene product from the secondary polymerization vessel to the receiver and from the receiver for its further treatment, is all as described above in connection with the polymerization vessel and receiver of Example 1.

Dense phase flow of the particulate, solid polyethylene employed in my process is distinguished from conventional aerated flow of particulate solids by no more than about 15% gas, by weight of the polyethylene, accompanying the polyethylene flowing through a conduit. The minimum amount of gas accompanying the polyethylene will vary with the gas pressure on the body from which the polyethylene is withdrawn and its particle size. In general, this will be the amount of gas at that pressure in the interstices of the particulate, solid polyethylene at its settled bulk density.

I claim:

1. In the process for transferring a body of particulate, solid polyethylene wetted with a solvent for ethylene and containing a catalyst promoting polymerization of ethylene from a first zone under elevated pressure of a gas in contact with said body of polyethylene into a second zone under a lower gas pressure, that improvement which comprises providing a passageway from within said body of polyethylene into said second zone and establishing differential gas pressures on said body of polyethylene in said first zone and in said second zone under which said polyethylene accompanied by no more than about 15% of the gas by weight of the polyethylene passes in dense phase flow from said body of particulate, solid polyethylene through said passageway and into said second zone.

2. The process for polymerizing ethylene to form a particulate polyethylene product which comprises introducing ethylene under a pressure above atmospheric, particulate, solid catalyst promoting polymerization of the ethylene and a solvent for the ethylene into a first reaction zone containing a bed of particulate, solid polyethylene wetted with said solvent for ethylene and flowing through and out of said reaction zone, showering particulate polyethylene of said bed through the ethylene gas in said reaction zone and returning particulate polyethylene from advanced points to less advanced points in the bed flowing through said first reaction zone, passing particulate polyethylene wetted with said solvent and carrying said particulate catalyst into a second reaction zone in which the particulate polyethylene is showered through ethylene gas under pressure above atmospheric and is advanced through said second zone to form a body of dense phase, particulate, solid polyethylene, and withdrawing polyethylene from said body by dense phase flow of the particulate polyethylene through a passageway to a third zone maintained under a lower pressure than that in said second polymerization zone.

3. The process of claim 1 wherein the polyethylene passing into the final zone is accompanied by about 1% of the solvent by weight of the polyethylene; and wherein said catalyst, contained in the polyethylene, is a particulate, solid catalyst amounting to about 0.05% by weight of the polyethylene.

References Cited by the Examiner

UNITED STATES PATENTS

| | | | |
|---|---|---|---|
| 1,480,152 | 1/24 | Cox | 202—100 |
| 1,889,163 | 11/32 | Vogel-Jorgensen | 302—53 |
| 2,889,314 | 6/59 | Fritz | 260—94.9 |
| 2,924,591 | 2/60 | Roelen | 260—94.9 |
| 2,990,399 | 6/61 | Peterlein | 260—94.9 |
| 3,023,203 | 2/62 | Dye | 260—94.9 |

FOREIGN PATENTS

| | | |
|---|---|---|
| 795,971 | 6/58 | Great Britain. |
| 808,361 | 2/59 | Great Britain. |

OTHER REFERENCES

Brown, "Unit Operations," 1950, pages 194–5, TP 155 B7.

JOSEPH L. SCHOFER, *Primary Examiner.*

M. LIEBERMAN, *Examiner.*